C. H. FELKER.
CHICKEN FEEDER.
APPLICATION FILED SEPT. 11, 1916.

1,290,729. Patented Jan. 7, 1919.

Inventor
Charles H. Felker
By Ellis Spear Jr.
Attorney

UNITED STATES PATENT OFFICE.

CHARLES H. FELKER, OF WOLLASTON, MASSACHUSETTS.

CHICKEN-FEEDER.

1,290,729.　　　　Specification of Letters Patent.　　Patented Jan. 7, 1919.

Application filed September 11, 1916. Serial No. 119,428.

*To all whom it may concern:*

Be it known that I, CHARLES H. FELKER, a citizen of the United States, residing at Wollaston, State of Massachusetts, county of Norfolk, have invented certain new and useful Improvements in Chicken-Feeders, of which the following is a specification.

This invention relates to chicken feeders of the type wherein a trough adapted to contain the food and a cover having a plurality of food openings are detachably connected to each other.

The object of my invention, generally stated, is to improve and simplify the construction of devices of this character. This object, together with certain other features of advantages, which will appear more fully hereinafter, is secured in the device of the present invention.

A preferred form of the invention is described in the following specification and illustrated in the accompanying drawing, wherein—

Figure 1:
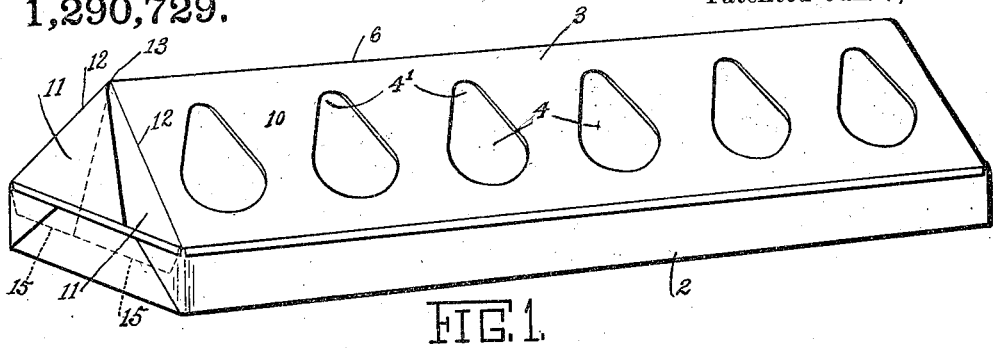
Figure 1 is a perspective view of the feeder.
Figure 2:
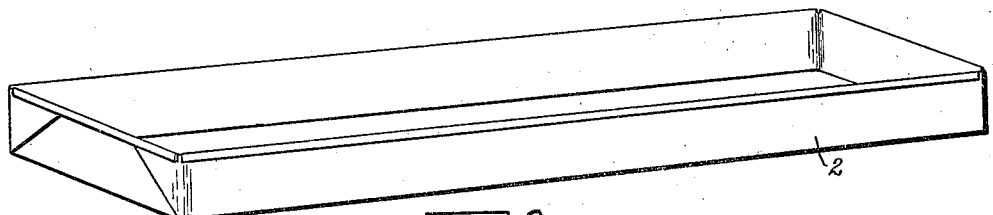
Fig. 2 is a view of the detached pan or trough.

In the illustrated embodiment of my invention I show a pan or trough receiving portion 2 which may be of suitable contour and proportion and removably mounted upon this pan or bottom 2 there is provided a top, crown or cover member 3 having a lower edge portion conforming to the rim of the pan 2 so that the two members may be assembled in interengaging relation to form a closed food chamber.

It is one of the features of the present invention to provide a chicken feeder with its wall structure having one or more ingress or feeding apertures as is shown at 4 which provides for the access by the chicks to the interior of the feeder and preferably so formed and designed as to prevent the chicks from bodily entering the food containing chamber of the feeder. To that end I have devised and successfully used a feeder, the walls of which are provided with apertures each of substantially egg or pear shaped outline, the larger end of the opening being positioned downwardly and the smaller end $4^1$ of the opening disposed uppermost. Preferably the area of the opening and the contour thereof, is such as to permit the head of a chick to be readily passed into the food chamber while the converging upper portion of the opening serves to encounter the shoulders of the chicks and thereby effectively prevent the chicks from climbing into the food chamber. While I have shown the chick feeder in the present illustration as of oblong form it is understood that it may be of any desired shape and that the openings 4 of this particular contour may be arranged at a suitable height and position in the wall or walls of the feeder.

Preferably the trough or pan 2 of the feeder is of oblong form and relatively narrow so that when the cover portion 3 is adjusted on the pan after the latter is filled with food or other material to be supplied to the chicks, there will be a minimum waste of the material because by providing an oblong cover for the pan with openings in opposite sides, the chicks can reach and obtain practically all of the substance contained therein. Another advantage of providing an oblong and relatively narrow feeder is that it occupies but small floor area and may be more efficiently disposed in the brooder house, in an advantageous way not possible with a circular feeder.

Figure 3:
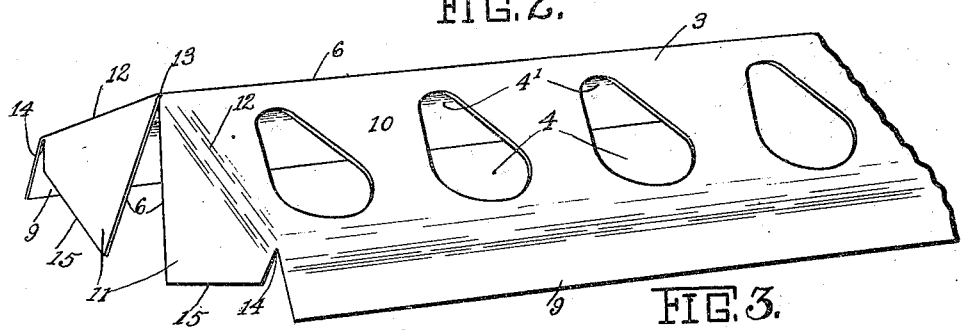
Fig. 3 is a perspective view of the detached cover.
Figure 4:
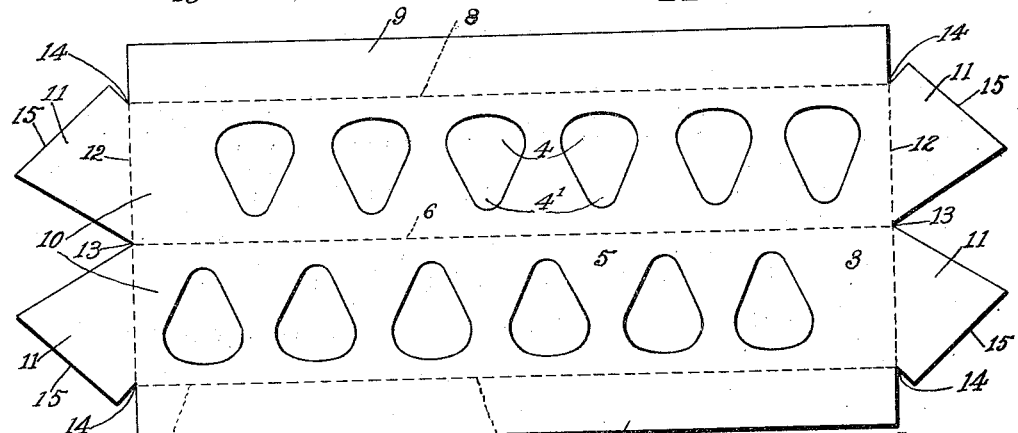
Fig. 4 is a plan view of the blank from which the cover is formed.

An important feature of the present invention resides in the structure of the hood or crown 3 and in the present instance the hood 3 is formed from an integral piece of flat stock preferably metal of blank form, shown in Fig. 4. The cover 3 is formed up from the blank 5 which has a general rectangular portion adapted to be folded centrally along the line 6 to the desired angle to form a ridge or hipped crown. The marginal edge portions of the blank 5 are foldable downwardly along the dotted lines 8—8 to form flanges 9—9 at a suitable angle to the inclined central portions 10—10, the relative angularity of these latter portions being readily varied by springing along the line 6—6 so that the flanges 9—9 may be snugly and yieldably pressed into frictional holding engagement with the vertical walls of the pan 2. The marginal flanges 9—9 are preferably of a depth substantially equal to the height of the wall of the pan 2 and the lines of fold 8—8 produce shoulders at opposite sides of the cover 3 from which the top portions 10—10 incline upwardly and converge to the ridge line 6; the ingress opening 4 being disposed intermediately between the ridge line 6 and the shoulders 8, Fig. 3, so as to provide for the easy access of the chicks to the food in the feeder. When the removable crown or cover 3 is bent along the ridge line 6 with its legs or flanges 9 projected down into the pan 2 the triangular end openings between the portions 10—10 are adapted to be covered by a pair of substantially triangular shaped shields 11, one pair at each end of the body portion 5, these shields being foldable at right angles to the plan of their respective portions 10—10 along a fold line 12, Fig. 4. The end covering flaps or shields 11 are preferably of an area sufficiently large so that when the cover is folded along the ridge line 6, the shields 11 of one pair will slide into overlapping relation and thus effectually close the opening at the ends of the cover. Each shield portion 11 at one end of the cover, Fig. 4 has one angular edge which diverges from the median or fold line 6 from a point 13 and is also cut at its opposite corner at 14 on a line substantially parallel to the line of the edge opposite, and intersecting at 13 with the fold line 12. The outer edge 15 of each of the shields 11 is cut at such an angle to the fold line 12 that when the shields 11 are folded into overlapping position Fig. 1, the edges 15 of each pair of shields will come substantially into alinement and thus form a substantially complete end wall for the cover.

From the foregoing it will be seen that I have provided a chicken feeder having a relatively shallow oblong trough or pan for containing liquid, plastic, dry or other food, the pan adapted to be covered by a removable cover or top 3 which is foldable into a substantially arch shaped cross section and having relatively yielding or springing marginal edges adapted to engage slidingly with the corresponding upstanding walls of the pan or trough 2 the top being provided with a series of opposite ingress openings through which the chicks may have access to the food in the food chamber. Further, when the container is kept in stock or packed for shipment the yielding sides of the cover 3 may be sprung apart to permit of a large number of the covers to be nested compactly one upon and within the other, to occupy a small volume of space and at the same time be substantially protected against accident or injury and may be readily assembled when unpacked upon the respective pan or trough which may happen to be selected from the lot for assembly. The relatively yielding or springing sides of the cover portion 3 permit the proper frictional binding engagement of the cover with its pan 2 so as to eliminate any lost movement between these parts and thus prevent the accidental separation of these parts. By providing the overlapping end shields 11 and leaving these disconnected they are free to slide upon one another as their respective top portions 10 of the cover 3 are sprung toward or from each other to accomplish the desired adjustment upon the pan 2.

In order that the pan may be entirely emptied by the chicks, the feeding holes are preferably disposed in alternate positions to each other on the opposite sides of the top as clearly shown in Fig. 4. This also prevents interference between chicks at opposite sides of the feeder. By making the top of angular and ridge-shape it prevents the chicks from roosting on top and thus fouling the feed and makes a perfectly sanitary feeder.

Various modifications from the structure herein disclosed may obviously be resorted to, within the scope of the appended claims.

What I therefore claim and desire to secure by Letters Patent is:—

1. In combination with an oblong relatively narrow container, a one-piece cover therefor formed from a generally rectangular blank, said blank folded centrally to provide opposed upwardly converging side walls leaving triangular end openings and said side walls bent longitudinally near their lower edges to provide depending flanges adapted to yieldingly engage the side walls of the container, closures for said end openings of the cover comprising a pair of triangular shields at each end of the blank adapted to be folded at right angles to the plane of the side walls into overlapping covering relation to the ends of the cover, the angular edge of each shield diverging from the median fold line of the blank and being cut at its opposite corner on a line intersecting the line of fold of the shield, and the outer edge of each shield being cut at such an angle to the line of fold of the shield as to bring the said edges into substantial alinement when a coöperating pair of shields is bent into closing position.

2. A chicken feeder, comprising a food chamber, an open ended cover therefor comprising converging side walls having feed openings therein, and a pair of shields at each end of the cover adapted to be folded at right angles to the plane of the side walls into overlapping covering relation to the open ends of the cover member, the outer edge of each shield being cut at such an angle to the line of fold of the shield as to bring said outer edges into substantial alinement when a coöperating pair of shields is bent into closing position.

3. A cover for a feed trough consisting of a member folded to provide converging open ended walls, said walls having feed opening therein, and a pair of foldable closures for said open ends, the outer edges of said closures being cut at such an angle as to bring said edges into substantial alinement when a coöperating pair of closures is bent into closing position.

4. A cover for a feed trough, consisting of a medially-folded arch-shaped open-ended member having feed openings, and closures for the ends of said member, each comprising a pair of relatively movable substantially triangular shields adapted to be folded into overlapping covering relation to the open ends of said member, the angular edges of said shields diverging symmetrically from the median fold line of the cover and being cut at their opposite corners on lines intersecting the lines of fold of the shields at acute angles.

In testimony whereof I affix my signature in presence of two witnesses.

CHARLES H. FELKER.

Witnesses:
GEORGE B. RAWLINGS,
M. F. WEISS.

Copies of this patent may be obtained for five cents each, by addressing the "Commissioner of Patents, Washington, D. C."